(12) United States Patent
Wang et al.

(10) Patent No.: US 6,584,293 B1
(45) Date of Patent: *Jun. 24, 2003

(54) PROCESS CARTRIDGE AND DEVELOPER CONTAINER ASSEMBLY

(75) Inventors: Jui-Chi Wang, Wu-Chi (TW); Robin Hsu, Taichung (TW); Ya Li Huang, Wu-Chi (TW); Kuan Tung Li, Shiluo Jen (TW); Ren-Hao Liu, Taichung (TW); Shu Hui Wang, Lungjing Shiang (TW); Xiao Hui Wang, Wu-Chi (TW); Ting Hsuan Ko, Shalu Jen (TW); Hui Wen Hsieh, Feng-Yuan (TW)

(73) Assignee: General Plastic Industrial Co., Ltd., Taichung County (TW)

( * ) Notice: Subject to any disclaimer, the term of this patent is extended or adjusted under 35 U.S.C. 154(b) by 0 days.

This patent is subject to a terminal disclaimer.

(21) Appl. No.: 10/171,035

(22) Filed: Jun. 11, 2002

(51) Int. Cl.$^7$ ............................................... G03G 15/08

(52) U.S. Cl. ...................................... 399/258; 399/260

(58) Field of Search ................................ 399/258, 106, 399/259, 260, 262, 111, 113, 105, 25; 222/DIG. 1; 141/346, 363, 364

(56) References Cited

U.S. PATENT DOCUMENTS

| | | | | | |
|---|---|---|---|---|---|
| 4,456,154 | A | * | 6/1984 | Herriman | 222/DIG. 1 |
| 5,111,976 | A | * | 5/1992 | Ban | 222/DIG. 1 |
| 5,475,469 | A | * | 12/1995 | Okada et al. | 399/264 |
| 6,009,289 | A | * | 12/1999 | Sekine et al. | 399/113 |

FOREIGN PATENT DOCUMENTS

| | | | | | |
|---|---|---|---|---|---|
| JP | | 07168435 A | * | 7/1995 | G03G/15/08 |
| JP | | 08179611 A | * | 7/1996 | G03G/15/08 |

* cited by examiner

Primary Examiner—Sandra Brase
Assistant Examiner—Ryan Gleitz
(74) Attorney, Agent, or Firm—Merchant & Gould; Tim Tingkang Xia (57) ABSTRACT

A process cartridge and developer container assembly is constructed to include a main cartridge holding an electrophotographic photosensitive member, developing means, charging means, and cleaning means, a developer container holding developer and detachably secured to the main cartridge, and a coupling member for enabling the developer container to be detachably coupled to the main cartridge. The main cartridge has a plurality of developer receiving openings, and a first sliding cover, which opens the developer receiving openings upon installation of the developer container in the main cartridge, or closes the developer receiving openings after removal of the developer container.

6 Claims, 8 Drawing Sheets

PROCESS CARTRIDGE AND DEVELOPER CONTAINER ASSEMBLY

BACKGROUND OF THE INVENTION

1. Field of the Invention

The present invention relates to a developer supply device and, more particularly to a process cartridge and developer container assembly adapted to be employed in an image forming apparatus, for example, an electrophotographic copying machine, an electrophotographic printer, an electrophotographic facsimile, an electrophotographic word processor, or the like.

2. Description of the Related Art

A regular cartridge for an image forming apparatus is generally comprised of an electrophotographic photosensitive member, developing means, charging means, cleaning means, and a developer container. When the developer of the developer container is depleted, the whole assembly of the process cartridge set becomes useless and must be thrown away. It is not economical to throw the whole assembly of the process cartridge set way after the process cartridge is depleted. Further, the waste process cartridge set may cause pollution to the environment if it is not disposed of properly.

SUMMARY OF THE INVENTION

The present invention has been accomplished to provide a process cartridge and developer container assembly, which eliminates the aforesaid drawbacks. In one aspect, the present invention relates to a process cartridge and developer container assembly, which enables the user to replace the developer container after the developer is depleted without throwing away the whole assembly of the process cartridge and developer container assembly. According to another aspect of the present invention, the process cartridge and developer container assembly is constructed to include a main cartridge that holds an electrophotographic photosensitive member, developing means, charging means, and cleaning means; a developer container that holds developer and is detachably secured to the main cartridge; and a coupling member for enabling the developer container to be detachably coupled to the main cartridge. According to another aspect of the present invention, the main cartridge has a plurality of developer receiving openings and a first sliding cover plate, which opens the developer receiving openings upon installation of the developer container to the main cartridge or closes the developer receiving openings after removal of the developer container from the main cartridge. According to still another aspect of the present invention, the process cartridge and developer container assembly further comprises a foolproof device which prevents engagement of the developer container into the main cartridge in the wrong direction.

DETAILED DESCRIPTION OF THE PREFERRED EMBODIMENT

Figure 1:
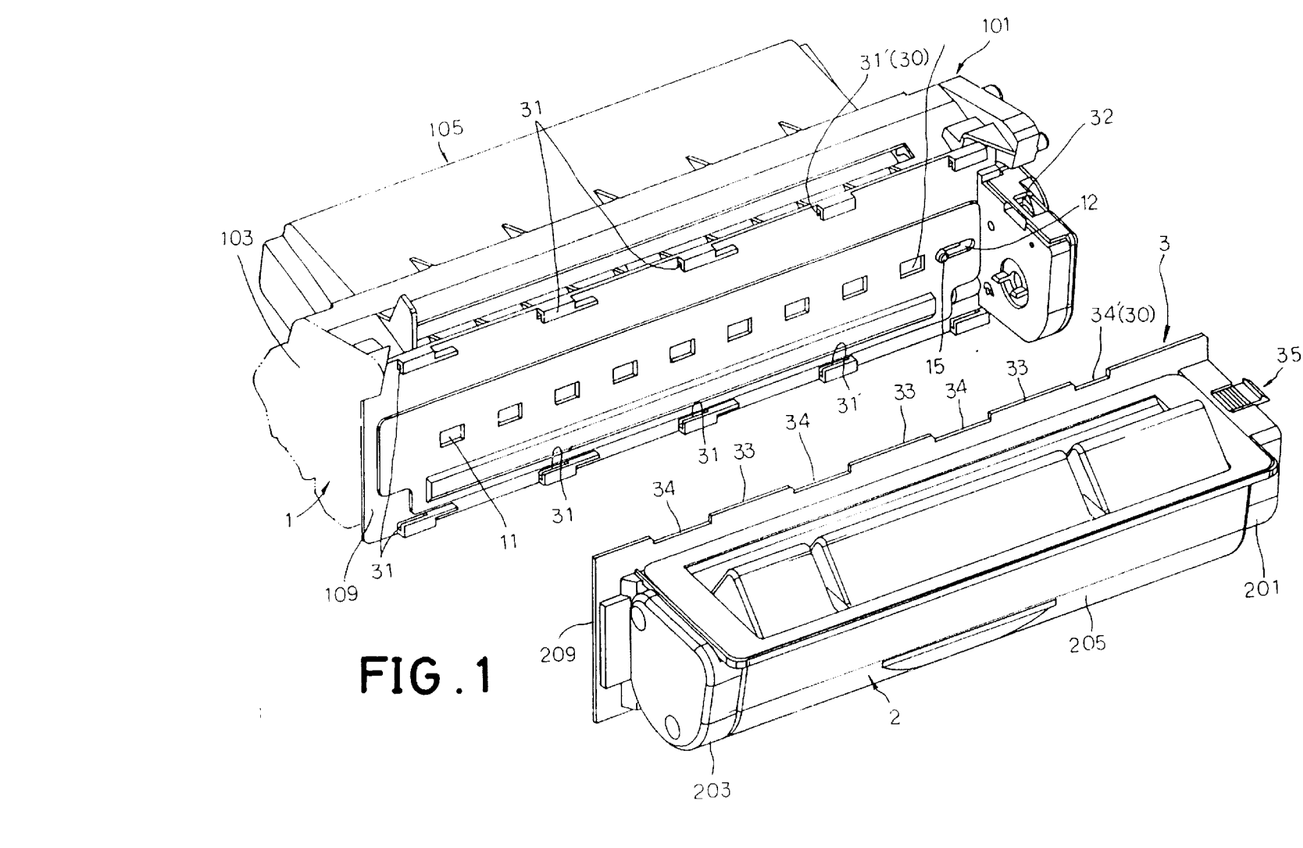
FIG. 1 is an exploded view of a process cartridge and developer container assembly constructed according to a first embodiment of the present invention.
Figure 2:
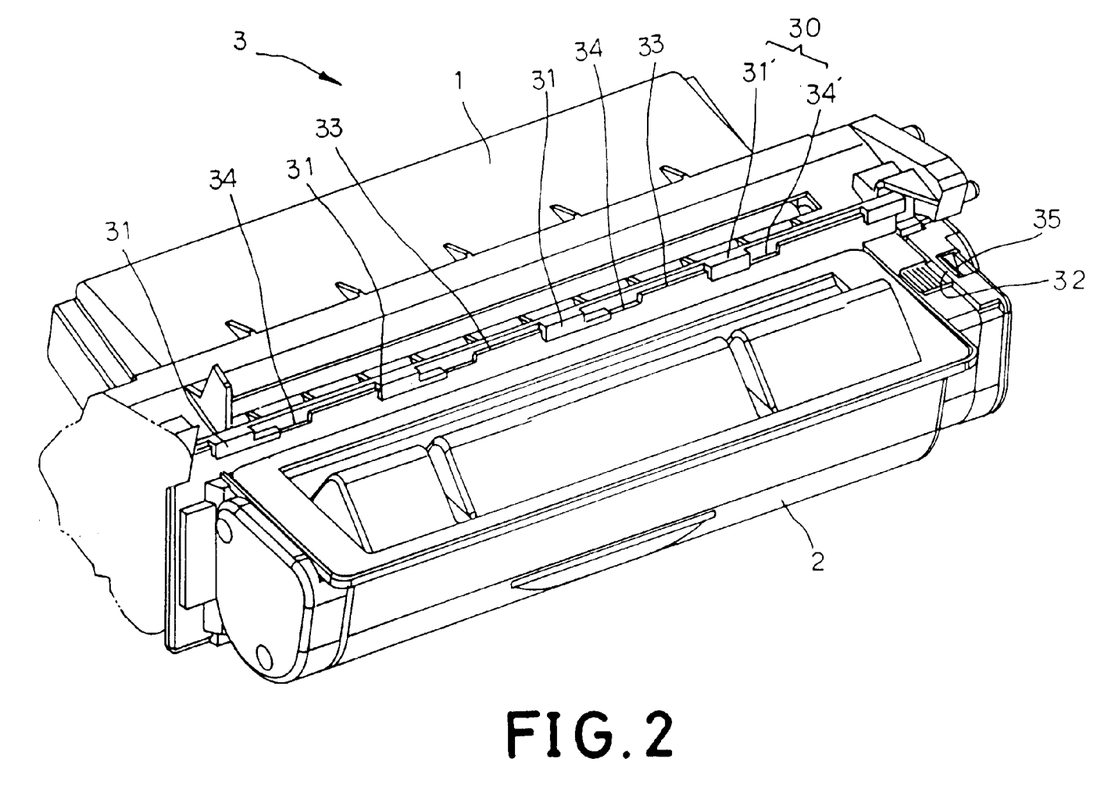
FIG. 2 is an assembly view of the process cartridge and developer container assembly of the first embodiment of the present invention.
Figure 3:
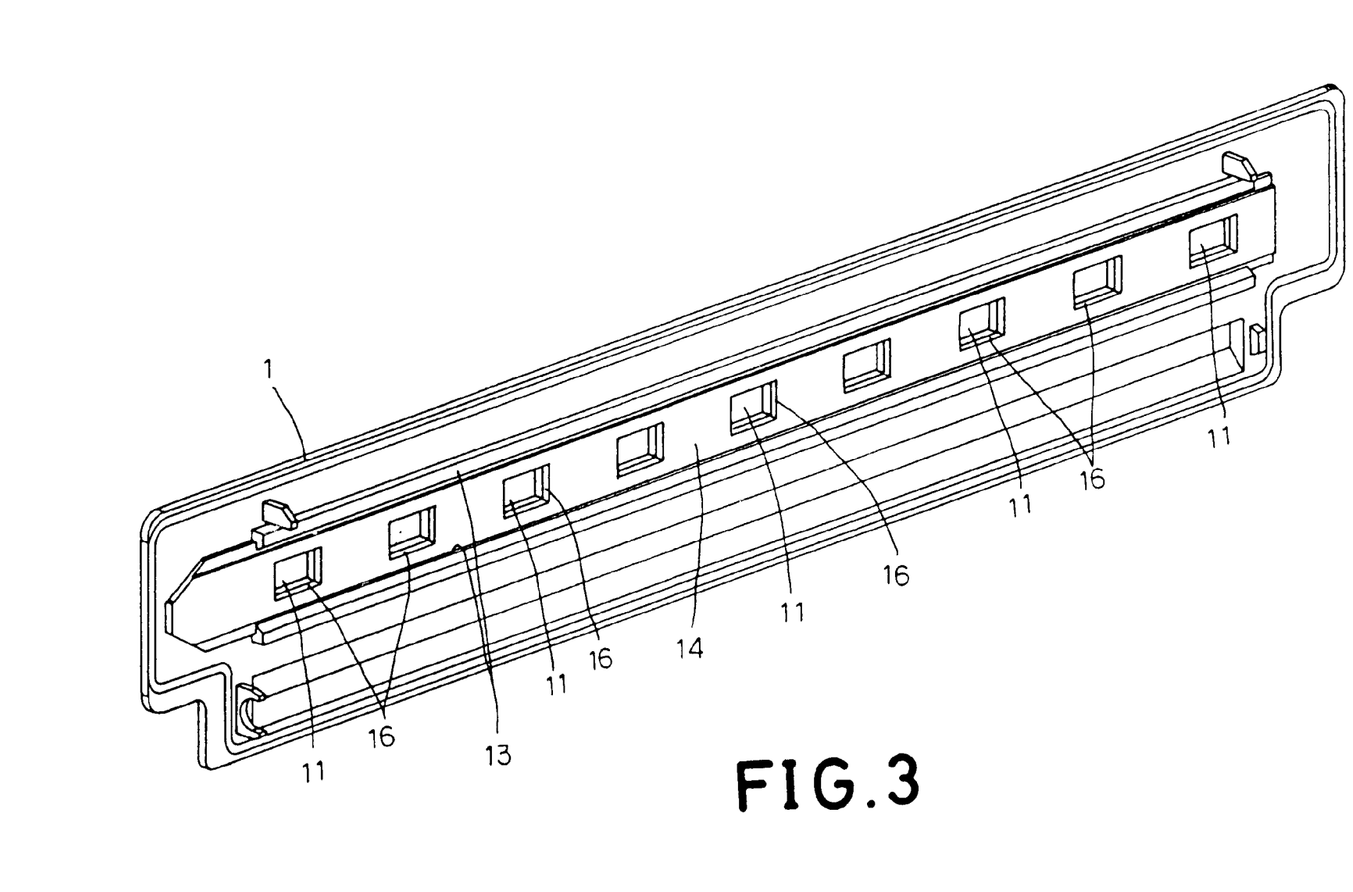
FIG. 3 is a rear elevational view of a part of the main cartridge of the process cartridge and developer container assembly according to the first embodiment of the present invention, showing the developer receiving openings opened.
Figure 4:
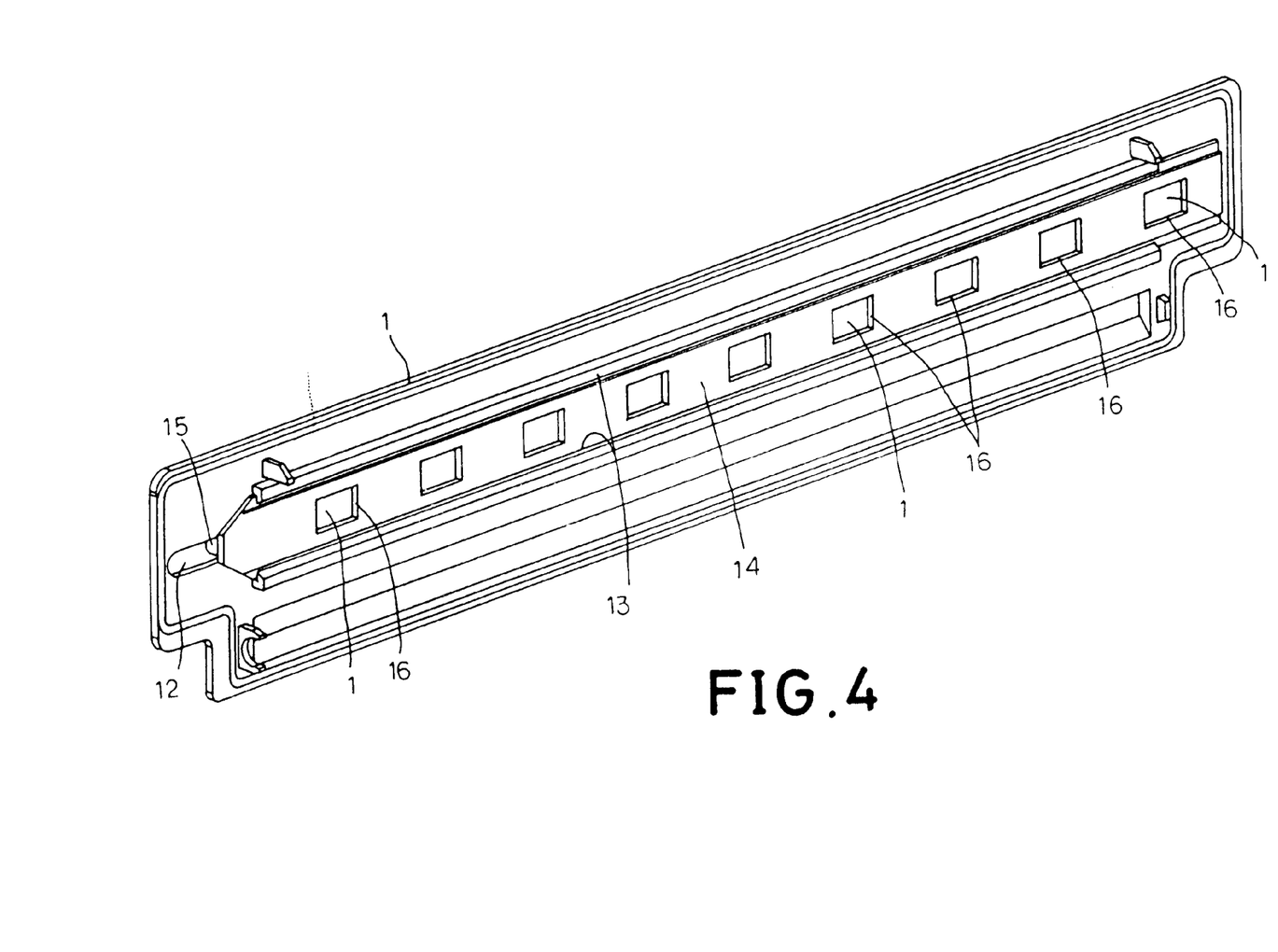
FIG. 4 is similar to FIG. 3 but showing the developer receiving openings closed.

Referring the FIGS. 1, 2, and 3, a process cartridge and developer container assembly in accordance with a first embodiment of the present invention is shown comprised of a main cartridge 1, a developer container 2 holding developer, and a coupling member 3 adapted for enabling the developer container 2 to be detachably coupled to the main cartridge 1. The main cartridge 1 holds an electrophotographic photosensitive member, developing means, charging means, and cleaning means (because the internal arrangement of the main cartridge 1 is not within the scope of the present invention, no further detailed description is necessary.) The main cartridge 1 comprises a first end 101, an opposite second end 103, and a body 105 defined between the first end 101 and the opposite second end 103, wherein the body 105 has an interior surface 109 with a plurality of developer receiving openings 11 formed thereon along a longitudinal axis of the body of the main cartridge 1, a sliding slot 12 disposed at one side of the developer receiving openings 11, first guiding members 13 respectively disposed on the interior surface 109 of the main cartridge 1 above and below said developer receiving openings 11, and a first sliding cover 14 inserted between the first guiding members 13 and movable along one of the longitudinal axis of the body of the main cartridge to close/open said developer receiving openings 11. The first sliding cover 14 has a first positioning member 15 inserted through the sliding slot 12 and a plurality of openings 16 corresponding to the developer receiving openings 11.

Figure 5:
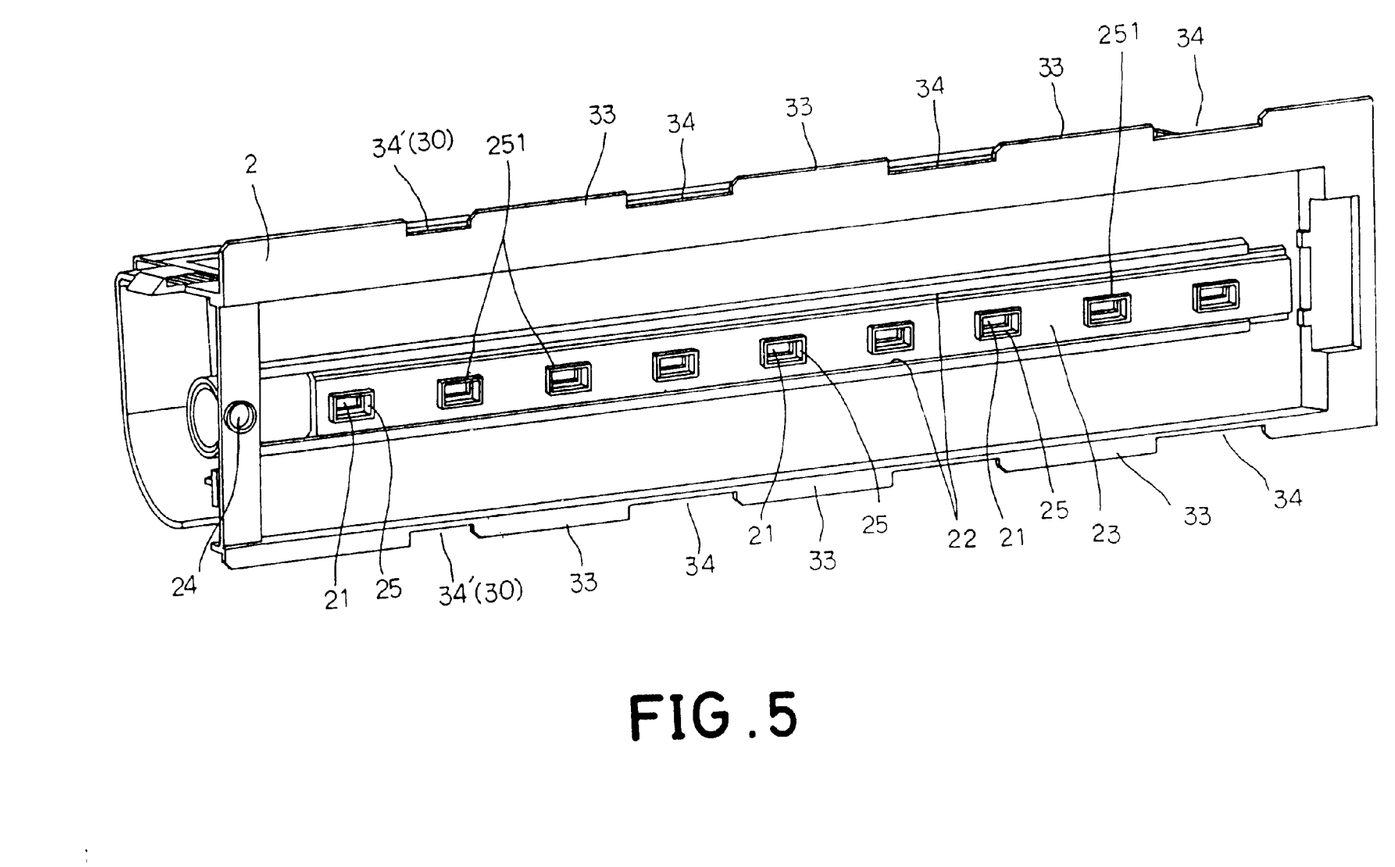
FIG. 5 is an elevational view of a part of the process cartridge and developer container assembly according to the first embodiment of the present invention, showing the developer supply openings opened.
Figure 6:
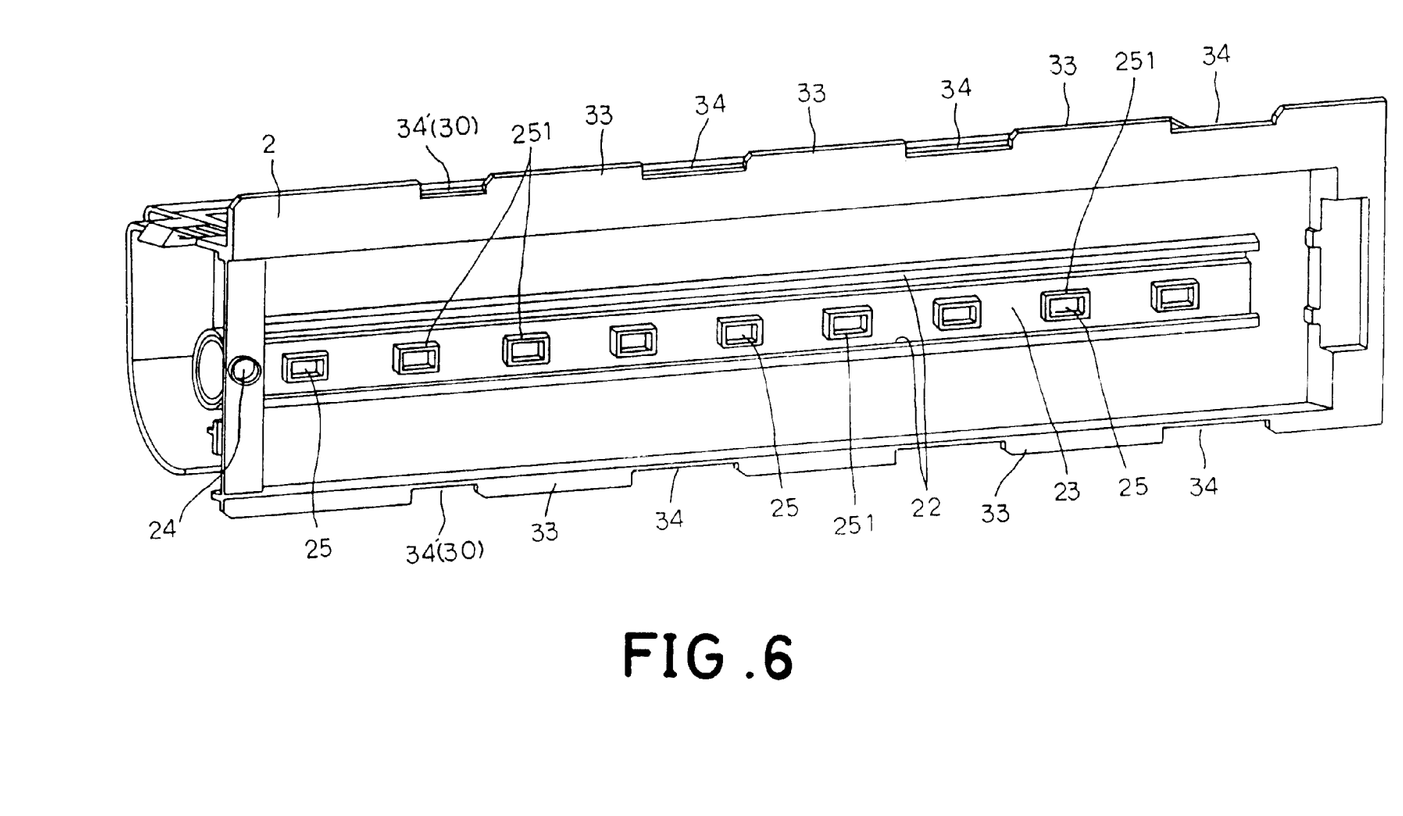
FIG. 6 is an elevational view of a part of the process cartridge and developer container assembly according to the first embodiment of the present invention, showing the developer supply holes closed.

Referring to FIG. 5 and FIG. 1 again, the developer container 2 comprises a first end 201, an opposite second end 203, and a body 205 defined between the first end 201 and the opposite second end 203, wherein the body 205 has an interior surface 209 with a plurality of developer supply openings 21 formed thereon along a longitudinal axis of the body of the developer container 2 corresponding to the developer receiving openings 11 of said main cartridge 1, second guiding members 22 respectively disposed on the interior surface 209 of the developer container 2 above and below the developer supply openings 21, a second sliding cover 23 inserted between the second guiding members 22 and movable along the longitudinal axis of the body of the developer container 2 to close/open said developer supply openings 21, and a second positioning member 24 corresponding to the first positioning member 15. The second sliding cover 23 has a plurality of openings 25 corresponding to the developer receiving openings 11 and projections 251 extended around each of the plurality of openings 25 of the second sliding cover 23.

The coupling member 3 comprises angled retaining lugs 31 forwardly protruded from top and bottom sides of the main cartridge 1 and arranged in two lines above and below the developer receiving openings 11, a hook hole 32 disposed at one lateral side of the main cartridge 1, retaining butts 33 and notches 34 alternatively arranged in top and bottom sides of the developer container 2 and arranged in two lines above and below the developer supply openings 21 corresponding to the forwardly protruded angled retaining lugs 31, and a springy hook 35 disposed at one lateral side of the developer container 2 corresponding to the hook hole 32 in the main cartridge 1.

The assembly process of the present invention is outlined hereinafter with reference to FIGS. 1 through 6. In operation, the notches 34 of the developer container 2 are positioned at the forwardly protruded angled retaining lugs 31 of the main cartridge 1 to force the forwardly protruded angled retaining lugs 31 into the notches 34, the first positioning member 15 of the first sliding cover 14 into the second positioning member 24 of the developer container 2, and the projections 251 of the second sliding cover 23 into the developer receiving openings 11 of the main cartridge 1. The developer container 2 is then shifted relative to the main cartridge 1 to force the springy hook 35 of the developer container 2 into engagement with the hook hole 32 of the main cartridge 1. When the developer container 2 is shifted relative to the main cartridge 1, the retaining butts 33 of the developer container 2 are forced into engagement with the forwardly protruded angled retaining lugs 31 of the main cartridge 1, and the first positioning member 15 is driven by the engagement between the first positioning member 15 and the second positioning member 24 of the developer container 2 to move the first sliding cover 13 along the longitudinal axis of the body 105 of the main cartridge 1 from a position wherein the first sliding cover 13 closes the plurality of openings 11 to a position wherein the first sliding cover 13 opens the plurality of openings 11 of the main cartridge 1.

On the contrary, when detaching the developer container 2 from the main cartridge 1, the springy hook 35 is disengaged from the hook hole 32 of the main cartridge 1, and then the developer container 2 is shifted in the reverse direction relative to the main cartridge 1 to remove the forwardly protruded angled retaining lugs 31 from the retaining butts 33 to the notches 34, and at the same time, the first sliding cover 23 of the main cartridge 1 and the second sliding cover 23 of the developer container 2 are moved from the open position to the close position to close the developer receiving openings 11 and the developer supply openings 21, respectively. Then the developer container 2 can be removed from the main cartridge 1.

Referring the FIGS. 1 and 2 again, the coupling member 3 further comprises a foolproof device 30 adapted for preventing false connection of the developer container 2 to the main cartridge 1. The foolproof device 30 comprises a relatively shorter or longer forwardly protruded angled retaining lug 31' on the top of the interior surface 109 as well as the bottom of the interior surface 109 of the main cartridge 1, and a relatively narrower or wider notch 34' on the top of the interior surface 209 as well as the bottom of the interior surface 209 of the developer container 2. When attaching the developer container 2 to the main cartridge 1 in the wrong direction, the forwardly protruded angled retainer lugs 31 cannot be engaged by the notches 34', and the forwardly protruded angled retainer lugs 31' cannot be engaged by the notches 34.

Figure 7:
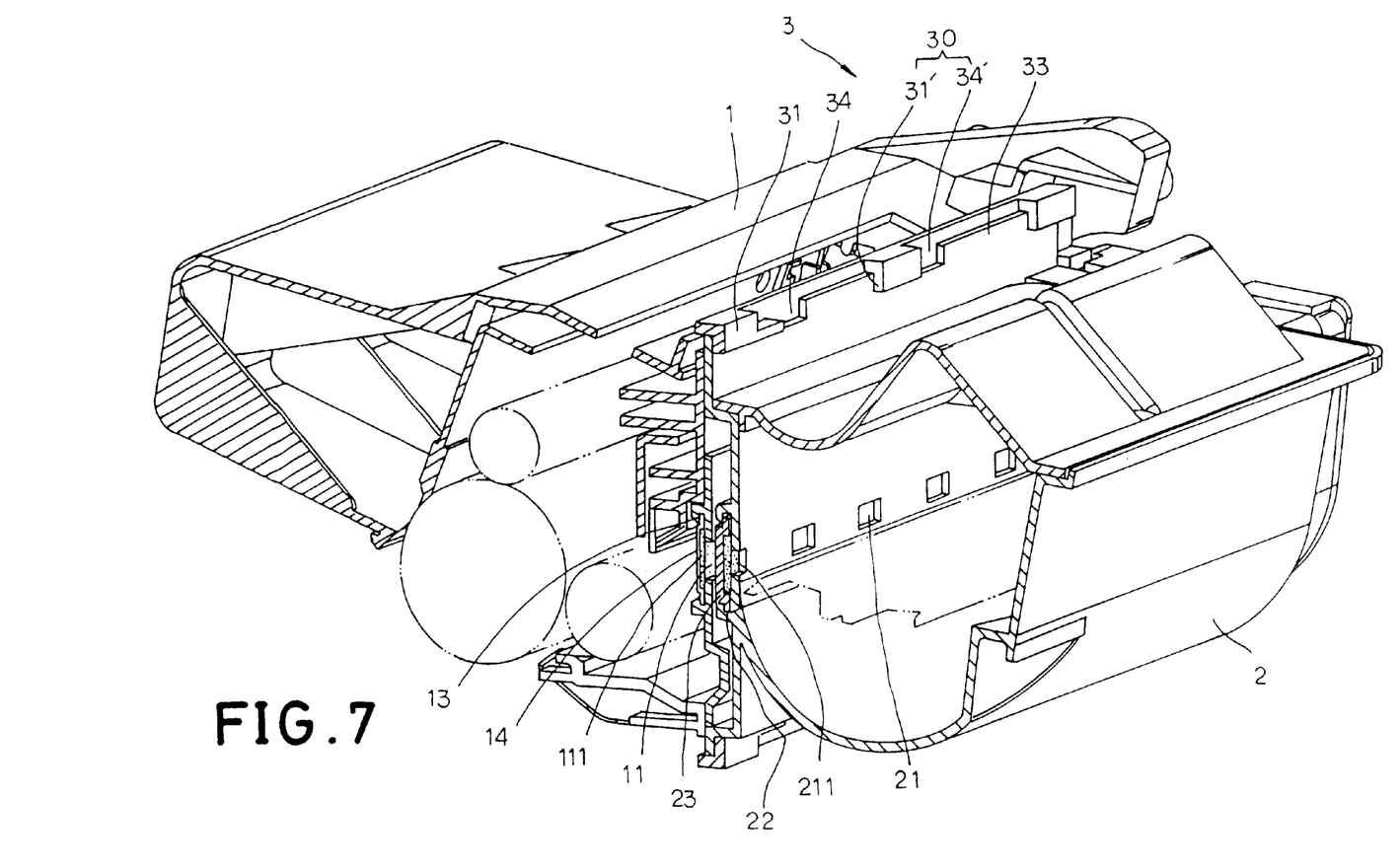
FIG. 7 is a cutaway view in an enlarged scale of the process cartridge and developer container assembly according to the first embodiment of the present invention.

Referring to FIG. 7, a sponge lining 111 is fixedly provided at one side of the first sliding cover 14 and disposed in close contact with the inside wall of the main cartridge 1 around the developer receiving openings 11 to prevent leakage of developer.

Referring to FIG. 7 again, a sponge lining 211 is fixedly provided at one side of the second sliding cover 23 and disposed in close contact with the inside wall of the developer container 2 around the developer supply openings 21 to prevent leakage of developer.

Figure 8:
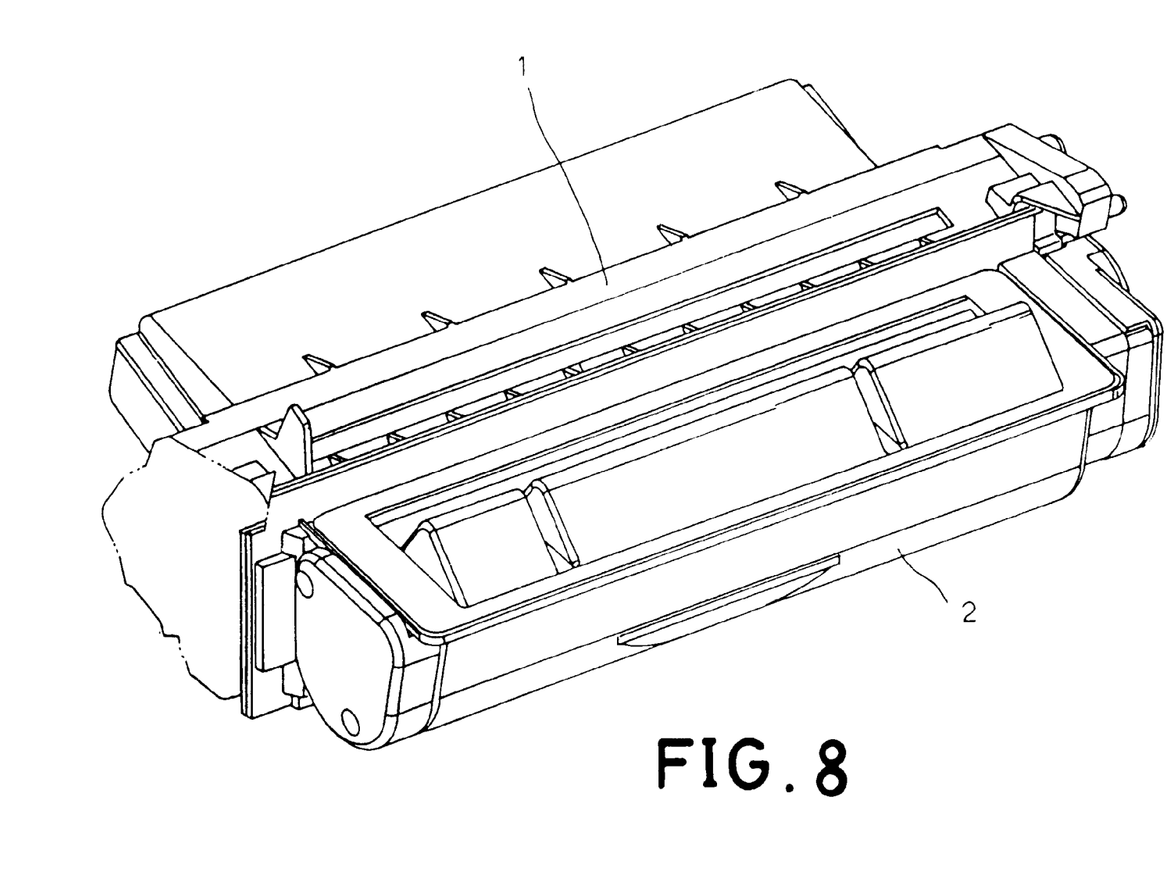
FIG. 8 is an elevational view of a process cartridge and developer container assembly constructed according to a second embodiment of the present invention.

FIG. 8 shows a process cartridge and developer container assembly constructed according to a second embodiment of the present invention. According to this embodiment, the process cartridge and developer container assembly is comprised of a main cartridge 1 and a developer container 2. The main cartridge 1 holds an electrophotographic photosensitive member, developing means, charging means, and cleaning means, having a plurality of developer receiving openings (not shown) disposed in one face thereof. The developer container 2 holds developer, having a plurality of developer supply openings (not shown) disposed in one corresponding to the developer receiving openings of the main cartridge 1. The developer container 2 is fastened to the main cartridge 1 by a double-sided adhesive tape, keeping the developer supply openings in communication with the developer receiving openings respectively. Alternatively, the developer container 2 can be fastened to the main cartridge 1 by an ultrasonic heat-sealing apparatus.

A prototype of process cartridge and developer container assembly has been constructed with the features of FIGS. 1~8. The process cartridge and developer container assembly functions smoothly to provide all of the features discussed earlier.

Although particular embodiments of the invention have been described in detail for purposes of illustration, various modifications and enhancements may be made without departing from the spirit and scope of the invention. Accordingly, the invention is not to be limited except as by the appended claims.

What the invention claimed is:

1. A process cartridge and developer container assembly, comprising:
   a main cartridge including an electrophotographic photosensitive member, developing means, charging means, and cleaning means, comprising:
   a first end, an opposite second end, and a body defined between the first end and the opposite second end, wherein the body has an interior surface with a plurality of developer receiving openings formed thereon substantially along a longitudinal axis of the body of the main cartridge;
   a sliding slot disposed at one side of said developer receiving opening;
   first guiding members respectively disposed on the interior surface of the main cartridge above and below said developer receiving openings;
   a first sliding cover inserted between said first guiding members of said main cartridge and movable along the longitudinal axis of the body of the main cartridge to close/open said developer receiving openings, said first sliding cover having a first positioning member adapted for engaging said sliding slot, and a plurality of openings corresponding to said developer receiving openings;
   a developer container for containing developer and detachably secured to said main cartridge, comprising:
   a first end, an opposite second end, and a body defined between the first end and the opposite second end, wherein the body has an interior surface with a plurality of developer supply openings formed thereon substantially along a longitudinal axis of the body of the developer container corresponding to the developer receiving openings of said main cartridge;

a second position member adapted for receiving said first positioning member of said first sliding cover of said main cartridge;

second guiding members respectively disposed on the interior surface of the developer container above and below said developer supply openings;

a second sliding cover inserted between said second guiding members of said developer container and movable along the longitudinal axis of the body of the developer container to close/open said developer supply openings, said second sliding cover having a plurality of openings corresponding to said developer receiving openings, and projections protruded from said second sliding cover, each projection extended around a corresponding one of the openings of said second sliding cover and adapted for engaging said developer receiving openings; and coupling means adapted for securing said developer container to said main cartridge.

2. The process cartridge and developer container assembly as claimed in claim 1, further comprising a sponge lining fixedly provided at one side of said first sliding cover of said main cartridge and disposed in close contact with the interior surface of said main cartridge around said developer receiving openings to prevent leakage of developer.

3. The process cartridge and developer container assembly as claimed in claim 1, further comprising a sponge lining fixedly provided at one side of said second sliding cover of said developing container and disposed in close contact with the interior surface of said developer container around said developer supply openings to prevent leakage of developer.

4. The process cartridge and developer container assembly as claimed in claim 1, wherein said coupling means comprises:

angled retaining lugs forwardly protruded from the top and bottom of said interior surface of said main cartridge, each angled retaining lug having a length;

a plurality of notches provided on the top and bottom of said interior surface of said developer container corresponding to said angled retaining lugs, each notch having a length;

a plurality of retaining butts provided on the top and bottom of said interior surface of said developer container and alternatively spaced by said notches and adapted for coupling to said angled retaining lugs of said main cartridge;

a hook hole disposed at one end of said main cartridge; and a springy hook disposed at one end of said developer container and adapted to be received in said hook hole.

5. The process cartridge and developer container assembly as claimed in claim 4, wherein said coupling means further comprises:

at least one angled retaining lug provided on the top and bottom of said interior surface of said main cartridge having a length that is different from the length of each of the other angled retaining lugs; and at least one notch provided on the top and bottom of said interior surface of said developer container having a length that is different from the length of each of the other notches and matching the at least one angled retaining lug of different length.

6. The process cartridge and developer container assembly as claimed in claim 1 wherein said coupling means is a double-sided adhesive tape.

* * * * *